United States Patent
Kalra et al.

(10) Patent No.: US 11,989,688 B2
(45) Date of Patent: May 21, 2024

(54) DECISION SUPPORT SYSTEM FOR OPTIMIZING THE UNIT IDENTIFIER STOCKING DECISION

(71) Applicant: Staples, Inc., Framingham, MA (US)

(72) Inventors: Amit Kalra, Acton, MA (US); Maimuna Rangwala, Framingham, MA (US); Ehsan Ardjmand, Framingham, MA (US); Christine DeJesse, Brooklyn, CT (US)

(73) Assignee: Staples, Inc., Framingham, MA (US)

( * ) Notice: Subject to any disclaimer, the term of this patent is extended or adjusted under 35 U.S.C. 154(b) by 182 days.

(21) Appl. No.: 17/650,223

(22) Filed: Feb. 7, 2022

(65) Prior Publication Data

US 2022/0230129 A1    Jul. 21, 2022

Related U.S. Application Data

(62) Division of application No. 15/257,909, filed on Sep. 6, 2016, now Pat. No. 11,244,278.

(51) Int. Cl.
*G06Q 10/087* (2023.01)

(52) U.S. Cl.
CPC ................. *G06Q 10/087* (2013.01)

(58) Field of Classification Search
CPC .................................... G06Q 10/087
See application file for complete search history.

(56) References Cited

U.S. PATENT DOCUMENTS

| | | | | |
|---|---|---|---|---|
| 10,328,805 | B1 * | 6/2019 | Wyrobek | ............. B60L 53/00 |
| 2003/0033180 | A1 | 2/2003 | Shekar et al. | |

(Continued)

FOREIGN PATENT DOCUMENTS

| | | | | |
|---|---|---|---|---|
| CA | 2402350 | A1 * | 9/2001 | ........... G06Q 10/087 |
| CA | 2402350 | A1 | 9/2002 | |
| CN | 104349891 | A | 2/2015 | |
| WO | 2013142106 | A1 | 9/2013 | |

OTHER PUBLICATIONS

Bhatnagar, "Textbook of Supply Chain Management," Chapter 10 "Packaging," pp. 197-214, 2009 (19 pages).

(Continued)

*Primary Examiner* — Michael Jared Walker
*Assistant Examiner* — Reva R Moore
(74) *Attorney, Agent, or Firm* — VLP Law Group LLP; Michel Bohn

(57) ABSTRACT

Technology for optimizing automated inventory management is described. In an example implementation, a method, implemented using one or more computing devices, may generate unit identifier sets based on affinities between items uniquely identified by the unit identifiers, determine first and second contribution values for each of the unit identifier sets, and calculate a difference between the first and the second contribution values for each of the unit identifier sets. The method may further calculate an incremental carton and expense prevention opportunity (ICEPO) value for the unit identifier sets, calculate an adjusted fulfillment center stocking score using the ICEPO value and the difference between the first and the second contribution values for each of the unit identifier sets, select a subset of the unit identifier sets based on the adjusted fulfillment center stocking score, and output the subset to an inventory replenishment system that manages stocking of items.

20 Claims, 5 Drawing Sheets

(56) References Cited

U.S. PATENT DOCUMENTS

| | | | |
|---|---|---|---|
| 2005/0197921 A1* | 9/2005 | Abo-Hasna | G06Q 10/0631 |
| | | | 705/28 |
| 2005/0197971 A1* | 9/2005 | Kettner | G06Q 10/087 |
| | | | 705/400 |
| 2009/0230190 A1 | 9/2009 | Chanez et al. | |
| 2011/0154046 A1 | 6/2011 | Fradet et al. | |
| 2011/0265428 A1 | 11/2011 | Schmitz | |
| 2013/0247519 A1 | 9/2013 | Clark et al. | |
| 2014/0343719 A1 | 11/2014 | Collombet et al. | |
| 2015/0332210 A1* | 11/2015 | Niquille | G06Q 10/087 |
| | | | 705/28 |
| 2016/0350721 A1 | 12/2016 | Comerford et al. | |

OTHER PUBLICATIONS

Collier et al., "OM 2 Part 2: Designing Operating Systems," 2010, pp. 162-170 (10 pages).

Inventory Optimization Needs the Right Processes to Make a Difference, Mar. 12, 2014, downloaded from http://www.supplychain247.com/article/inventory_optimization_needs_the_right_processes_to_make_a_difference, Dec. 19, 2016 (10 pages).

Xu et al., "Order Fulfillment in Online Retailing: What Goes Where," Sep. 2005, Massachusetts Institute of Technology (146 pages).

\* cited by examiner

DECISION SUPPORT SYSTEM FOR OPTIMIZING THE UNIT IDENTIFIER STOCKING DECISION

BACKGROUND

The present specification generally relates to the field of optimizing automated inventory management. For instance, the present specification relates to optimizing the stocked items in a fulfillment center.

Stocking decisions have a significant impact on supply chain performance. For example, stocking particular items at an appropriate location can reduce service time and increase customer satisfaction. However, due to capacity constraints of fulfillment centers, it is not possible to stock all items in each fulfillment center. Additionally, demand variations and regional competitors provide further incentive to localize and optimize the stocking of items to a particular fulfillment center.

One existing solution to the problem of not being able to stock all products in a single fulfillment center is inventory pooling. In inventory pooling, inventory of various items is stored in multiple fulfillment centers and, in order to satisfy customer demand, the items in an order may be shipped from one or more fulfillment centers, depending on items stocked in each of the fulfillment centers.

Selecting which items to stock in a particular fulfillment center and stocking those items is a non-trivial problem, particularly when there are hundreds of thousands or even millions of items available to stock, not to mention other fulfillment centers with different attributes than the particular fulfillment center. Accordingly, the present disclosure satisfies a long felt need for a computer algorithm that efficiently makes stocking decisions and, in some instances, stocks items based on those stocking decisions.

SUMMARY

According to one innovative aspect of the subject matter described in this disclosure, a system includes a computer processor and a non-transitory computer readable medium storing instructions that, when executed by the computer processor, are configured to perform operations including: generating, by one or more processors, one or more sets of unit identifiers based on one or more affinities between items uniquely identified by the unit identifiers; determining, by the one or more processors, a first contribution value for each of the one or more sets of unit identifiers; determining, by the one or more processors, a second contribution value for each of the one or more sets of unit identifiers; calculating, by the one or more processors, a difference between the first contribution value and the second contribution value for each of the one or more sets of unit identifiers; calculating, by the one or more processors, an incremental carton and expense prevention opportunity (ICEPO) value for each of the one or more sets of unit identifiers; calculating, by the one or more processors, an adjusted fulfillment center stocking score using the ICEPO value and the difference between the first contribution value and the second contribution value for each of the one or more sets of unit identifiers; selecting, by the one or more processors, a subset of the one or more sets of unit identifiers based on the adjusted fulfillment center stocking score; and outputting, by the one or more processors, the subset of the one or more sets of unit identifiers to an inventory replenishment system that manages stocking of items uniquely identified by unit identifiers.

In general, another innovative aspect of the subject matter described in this disclosure may be embodied in methods that include the operations described in reference to the system above.

These and other implementations may each optionally include one or more of the following features, such as: determining, by the one or more processors, the one or more affinities between items uniquely identified by the unit identifiers based on order data; that determining the one or more affinities between items uniquely identified by the unit identifiers based on the order data includes determining, by the one or more processors, a threshold frequency for identifying sets of unit identifiers, determining, by the one or more processors, groups of unit identifiers using the order data, each group of unit identifiers appearing within at least one individual order, and determining, by the one or more processors, a quantity of individual orders in which each group of unit identifiers appears; that generating the one or more sets of unit identifiers based on the one or more affinities between items uniquely identified by the unit identifiers includes selecting, by the one or more processors, the one or more sets of unit identifiers from among the groups of unit identifiers based on the quantity of individual orders in which each group of unit identifiers appears and the threshold frequency for identifying sets of unit identifiers; that the first contribution value is determined for a first fulfillment center; that the second contribution value is determined for a second fulfillment center; that calculating the ICEPO value for the one or more sets of unit identifiers includes determining a delivery expense from a fulfillment center to a defined location for items uniquely identified by the one or more sets of unit identifiers; that calculating the ICEPO value for the one or more identity code sets further includes calculating the ICEPO value for the one or more sets of unit identifiers includes determining a delivery expense from an alternate fulfillment center to the defined location for the items uniquely identified by the one or more sets of unit identifiers; and that selecting the subset of the one or more sets of unit identifiers based on the adjusted fulfillment center stocking score includes sorting the one or more sets of unit identifiers into a hierarchy based on the adjusted fulfillment center stocking score, and selecting the subset of the one or more sets of unit identifiers based on a threshold quantity of sets of unit identifiers based on the hierarchy and an excess stocking capacity of a fulfillment center.

Other implementations of one or more of these aspects include corresponding systems, apparatus, and computer programs, configured to perform the actions of the methods, encoded on computer storage devices.

In general, another innovative aspect of the subject matter described in this disclosure may be embodied in a system that includes a stocking decision engine configured to determine affinities between unit identifiers based on order level data, determine frequent unit identifier sets based on the affinities between the unit identifiers and the order level data, determine incremental carton and expense prevention opportunity (ICEPO) values for the frequent unit identifier sets based on carton and expense data, determine contribution values for the frequent unit identifier sets, optimize a combination between the ICEPO values and the contribution values for the frequent unit identifier sets to generate a stocking decision, and communicate the stocking decision to an inventory replenishment system via a computer interface; and the inventory replenishment system configured to receive the stocking decision from the stocking decision engine via the computer interface, and stock or destock items in a fulfillment center based on the stocking decision.

These and other implementations may each optionally include one or more of the following features including that the inventory replenishment system is further configured to stock or destock items in the fulfillment center based on a forecasted demand of the items for a geographic region served by the fulfillment center.

The techniques described herein provide many benefits and have substantially improved the underlying technology for automated inventory management and inventory stocking, especially in systems where many thousands or millions of items are available and shipped on a regular basis from one or more fulfillment centers. Specifically, the techniques described herein provide an efficient process for calculating an objective function for sets of unit identifiers in order to estimate the demand and flow of items in a network of fulfillment centers. Accordingly, the number of factors analyzed using the techniques described herein are much greater that possible using previous systems. The integration of these factors substantially improves automated inventory management systems to both improve the accuracy of stocking decisions and the efficiency of the underlying computing systems. For example, the techniques described herein improve computational efficiency when calculating stocking decisions by presenting an efficient method of calculating and pre-calculating factors of an objective function for evaluating whether to stock an item. Accordingly, these techniques reduce processor load and data transmission requirements of existing systems.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Technology for optimizing the stocking decision in a network of fulfillment centers with a pooled inventory is described herein. In some implementations, the technology includes a warehouse management system, in which order level data is retrieved and used, along with fulfillment center attributes, to provide a stocking decision and, in some instances, automatically stock items in certain fulfillment center(s) according to the stocking decision.

In some implementations, a warehouse management system for one or a network of fulfillment centers uses unit identifiers to identify items that may be ordered and stocked. A unit identifier may include a unique identification code for identifying products, such as a stock keeping unit, a universal product code, international article number, inventory stock number, or any other code that may be used by a computing system to identify products.

In some implementations, the techniques described herein analyze order level data, estimate the demand and flow of unit identifiers in a fulfillment center network, and calculate factors that contribute to a stocking decision. For example, the system may improve an incremental carton and expense and a contribution value by considering an affinity (e.g., an affinity may be based on correlated demand between items represented by the unit identifiers) between unit identifiers, delivery expenses, etc.

For the purposes of this disclosure, a contribution value represents a benefit (e.g., a profit margin) obtained by selling an item represented by a unit identifier less the cost of the item and variable supply chain expenses. Among other factors, whether an item is stocked in a particular fulfillment center can change the contribution value, for example, due to changes in supply chain costs.

For the purposes of this disclosure, an incremental carton and expense ("ICE") is the extra cost of delivering an item from a non-prime fulfillment center. For example, the extra cost may be due to shipping an extra carton (e.g., a package with one or more items inside) and/or due to shipping a carton from a further distance or different fulfillment center. Whether an item is stocked in a particular fulfillment center may create or eliminate an ICE prevention opportunity for saving the cost of extra cartons necessary for delivering the non-stocked item to a customer when more than one item is ordered by the customer.

Figure 4:
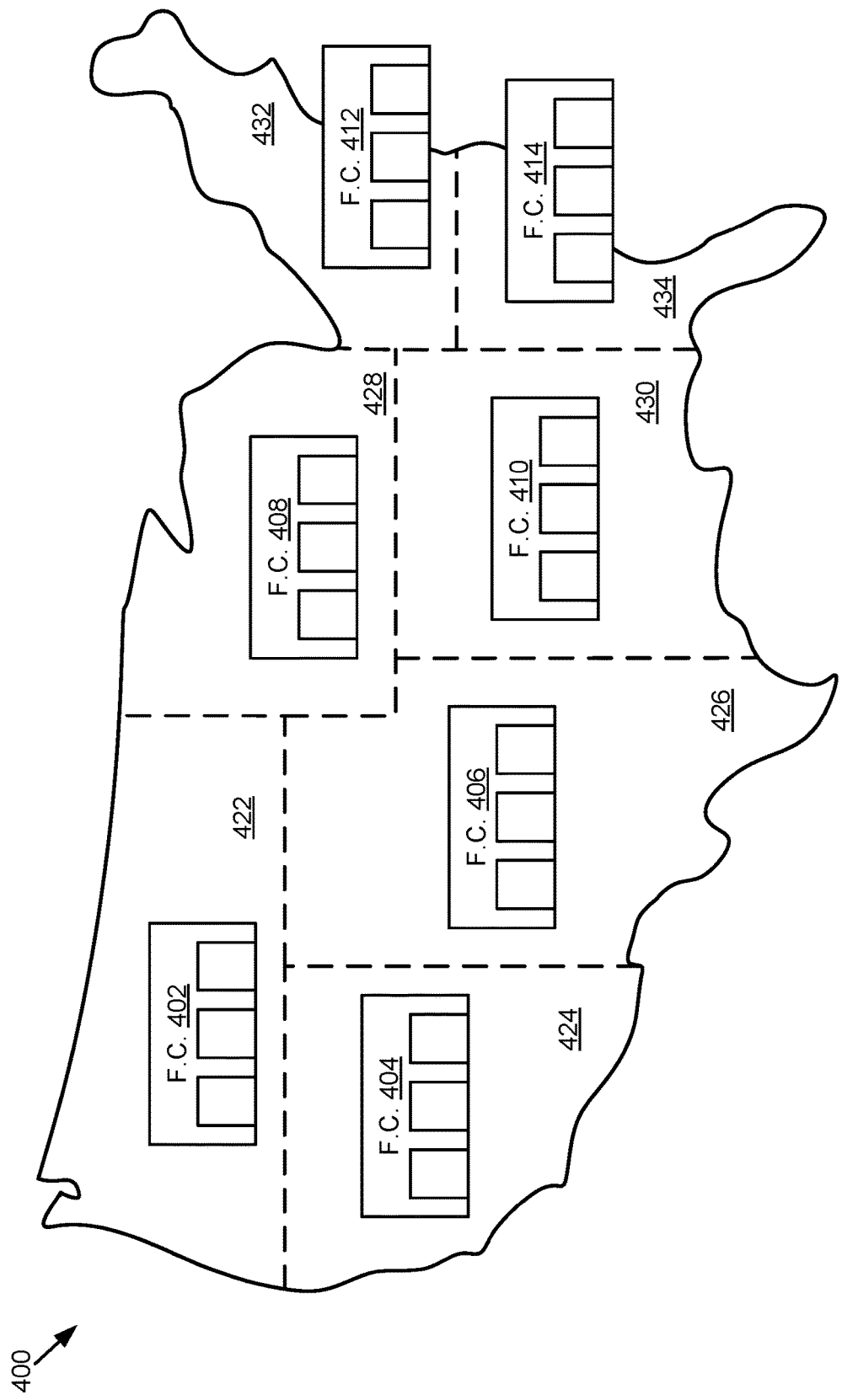
FIG. 4 is a diagram illustrating an example implementation of fulfillment centers serving various geographic regions.

A prime fulfillment center represents the fulfillment center for which the stocking decision is being made, such as the closest fulfillment center to a delivery location or geographic region for which the order data pertains (e.g., as described in reference to FIG. 4). A non-prime fulfillment center may include any fulfillment center other than the prime fulfillment center, for example, an alternate fulfillment center, a wholesaler fulfillment center, a manufacturer fulfillment center, etc.

Although multiple implementations are possible, the techniques described herein take into consideration affinity between unit identifiers, contribution values, and ICE. The analysis described herein is directed to finding an optimal stocking decision based on these and other factors in order to maximize profit and minimize ICE.

Figure 1:
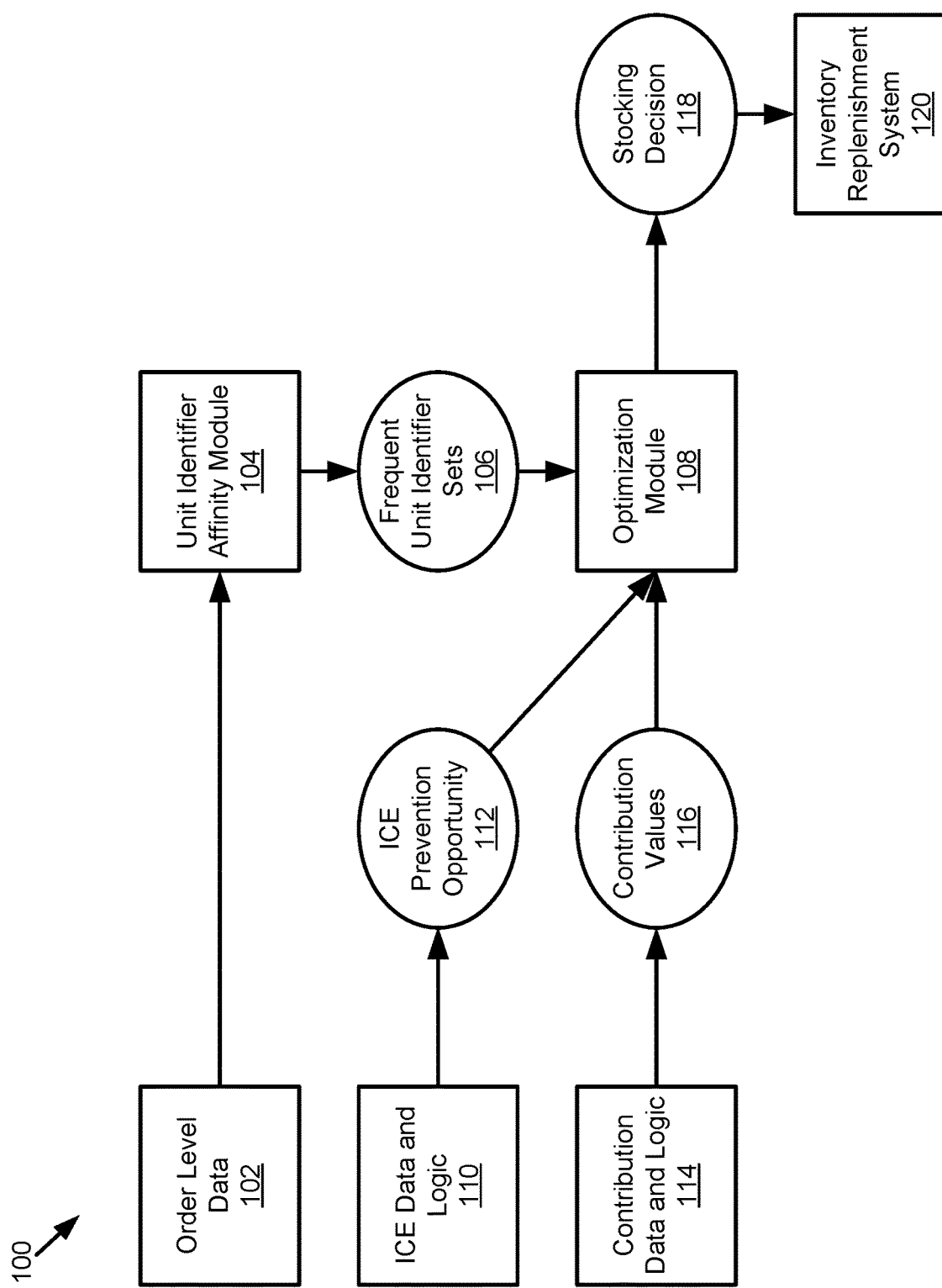
FIG. 1 is a data flow diagram illustrating an example data flow for a warehouse management system.

FIG. 1 is a data flow diagram 100 illustrating an example data flow for a warehouse management system. The warehouse management system may consider order level data, contribution margin, and ICE to formulate, and in some instances, execute actions based on a decision to stock or destock an item or frequent unit identifier set. Further, in some instances, the warehouse management system may continuously or periodically look at historical demand and adjust for future planned promotional and assortment activity. It should be noted that the operations and entities described may be further delineated or changed from those described in the flow diagram 100.

Order level data 102 includes data representing demand for items. In particular, the order level data 102 may represent demand for each unit identifier at each physical location (e.g., a fulfillment center, a geographic region, etc.) which is a potential candidate for either stocking or not stocking the unit identifier. For example, order level data 102 may include data describing unit identifiers of items in one or more customer orders from a merchant. In some instances, order level data 102 may describe orders received by a fulfillment center (e.g., for packaging and/or shipping).

In some implementations, a cost-to-serve system pulls data from multiple order management systems and consolidates them together into the order level data 102 to create a single view of all demand coming from different sources (e.g., e-commerce, business-to-business commerce, other sales channels, etc.).

The unit identifier affinity module 104 uses the order level data to generate frequent unit identifier sets 106 (e.g., the unit identifier affinity module 104 may calculate the affinity between unit identifiers), which are transmitted to the optimization module 108. A frequent unit identifier set is a collection of unit identifiers that are ordered together often enough that their ordering frequency satisfies a defined threshold and there is a higher probability that the unit identifiers within the set are ordered together (e.g., if one item is present in an order, then there is a threshold probability that a second item will be present in the order). In particular, a unit identifier set is frequent if it has high support and its member unit identifiers have high confidence. High support is indicated by the number of times that the set is observed in order data. Confidence is defined for each unit identifier in the set. Confidence of a unit identifier in a set is the probability that the unit identifier will be ordered if the other members of the set are ordered.

As an example, Table 1 depicts an example order table with 4 unit identifiers (A, B, C, and D) and 10 orders. The quantity of each unit identifier is shown.

TABLE 1

| Order# | A | B | C | D |
|---|---|---|---|---|
| 1 | 1 | 2 | 1 | 2 |
| 2 | 2 | | | |
| 3 | | 3 | 2 | |
| 4 | 1 | 1 | | |
| 5 | | 2 | 1 | 1 |
| 6 | 1 | | | 2 |
| 7 | 4 | 1 | | |
| 8 | 2 | 1 | 2 | |
| 9 | | 2 | 2 | 1 |
| 10 | 1 | | | |

For illustration purposes, if the threshold frequency is determined to be that the unit identifier set is ordered more than 3 times in total, then the frequent unit identifier sets are {B, C, D}, {A, B}, {B, C}, {C, D}, {B, D}, {A}, {B}, {C}, and {D}. It should be noted that each individual unit identifier in a unit identifier set may be considered to be a frequent unit identifier set (e.g., a set with only a single member); however, to capture the affinity between unit identifiers, single member sets are less informative.

ICE data and logic 110 may determine an incremental carton and expense ("ICE") or ICE prevention opportunity value (e.g., the ICE that may be prevented by stocking an item corresponding to a unit identifier). An ICE may include an incremental carton and an incremental expense, which may be affected by whether or not a unit identifier is stocked. The ICE or ICE prevention opportunity value may then be used by the optimization module 108 to compute a stocking decision.

An incremental carton is a cost incurred due to an additional carton or package that is used when one or more items in an order is not available in prime fulfillment center, so an additional incremental carton is shipped to cover the order (e.g., items that could have shipped with other items). For example, if a full case were being shipped in a single carton, then no additional cartons (e.g., incremental cartons) would be incurred; however, if the case were broken so that items were shipped in multiple cartons, then an incremental carton expense would be incurred for those additional cartons/packages required for separate fulfillment. In some implementations, the incremental carton includes those cartons that are shipped from a non-prime fulfillment center. For example, if items in an order must be shipped from two separate fulfillment centers due to the items not being stocked in a single fulfillment center, then an incremental carton may be incurred.

An incremental expense is a cost that may be incurred by shipping a carton from a further fulfillment center when the item is not stocked in a nearby or prime fulfillment center (e.g., for delivering the same number of cartons, but shipped by a more expensive mode or from a more expensive/distant geographic zone). In some implementations, an incremental expense may be determined by calculating the cost of shipping an item from a prime fulfillment center (e.g., at a first zip code) to a customer (e.g., at a second zip code), calculating the cost of shipping the item from an alternative fulfillment center (e.g., at a third zip code) to the customer (e.g., at the second zip code), and determining any additional cost incurred by shipping the item from the alternative fulfillment center over that which would be incurred if the item were shipped from the prime fulfillment center.

In some implementations, the ICE data and logic 110 may determine the ICE that results when a unit identifier is not stocked in a given fulfillment center based on certain factors, such as supply chain cost for each fulfillment center and delivery location. Additionally, cost data for alternative locations from which an item represented by a unit identifier can be obtained by the ICE data and logic 110 for wholesalers, vendors, other fulfillment centers, etc. Accordingly, the ICE may be calculated for each unit identifier for each potential location based on demand.

Calculation of the ICE may be based on shipping mode, flow path, and/or other factors that cause either incremental cartons or incremental expense. In some implementations, shipping mode or flow type cost may be determined based on shipping methods (e.g., UPS®, FedEx®, etc.), wholesaler shipping, vendor drop shipping, freight shipping, etc. In some implementations, other factors that cause incremental cartons or incremental expenses may include stocking decisions and processes (e.g., margin criteria, restock/destock criteria, business rules, etc.), replenishment decisions and processes (e.g., demand forecast, replenishment execution efficiency, etc.), inbound transportation (e.g., carrier delays, transportation issues, etc.), fulfillment center operations (e.g., average time spent, receiving efficiency, putaway efficiency, etc.), merchandising/sales decisions (e.g., assortment, promotions, pricing, end of life items, demand shaping, selling what is in stock, etc.), vendor performance (e.g., fill rates, vendor dropships, collect vs. prepaid, etc.), wholesaler processes (e.g., volume shift to wholesaler, wholesaler fill rate, etc.), etc. It should be noted that other methods and factors are possible and contemplated herein and that those described should not be construed as limiting.

The ICE prevention opportunity value 112 of each frequent unit identifier set may be defined as the sum of the ICE prevention opportunity value 112 that each of the unit identifiers in the frequent unit identifier set create separately. In some implementations, the ICE prevention opportunity value 122 equals the number of orders that include the unit identifier multiplied by the ICE for each order line. It should be noted that for the purposes of calculating ICE, the warehouse management system should focus on incremental expenses and not overall expenses.

As an example of an implementation of a calculation of an ICE prevention opportunity value, for an order of 4 items, A, B, C, and D, shipped in three cartons at an average of $3 per carton from a prime fulfillment center (e.g., as determined using one or more factors, as described above) for a total of $9. Alternatively, if part of the order must be shipped from an alternate fulfillment center, then additional ICE would be incurred. For example, if items A and B are still shipped from the prime fulfillment center in two cartons at $3 per carton and C and D are shipped from an alternate fulfillment center in another two cartons at $4 per carton, then the total switched cost would be $14 (3+3+4+4). Accordingly, the ICE prevention opportunity value would be $5 ($14−$9).

Contribution data and logic 114 includes data and logic for calculating contribution values. The warehouse management system may leverage the order level data 102 and/or other contribution data to calculate a contribution value for a unit identifier based upon whether and for what cost the item corresponding to the unit identifier can be stocked, obtained from a wholesaler, or otherwise obtained from the vender. A contribution value represents a benefit obtained by selling an item represented by a unit identifier less the cost of the item and variable supply chain expenses. In particular contribution value is a measure of profitability of an item that may allow a system to improve a return on net assets (RONA).

For a unit identifier, the contribution value may be measured as the net sales minus costs. For example, for a stocked unit identifier, costs may include net sales, net cost of goods sold, rebates, vendor funded coupons, inbound transportation expenses, holding costs, shrink, obsolescence, damages, fulfillment center variable handling costs, delivery expenses, etc. For a non-stocked unit identifier (e.g., for an item obtained from a wholesaler or a non-prime fulfillment center), the costs may be net wholesaler cost of goods sold, delivery expenses, etc. For an item obtained from a non-prime fulfillment center, the delivery expense may generally be higher and the higher value is used in place of the delivery expense from a prime fulfillment center. The difference between a stocked contribution margin and a non-stocked contribution margin illustrates an opportunity value that may be realized if items are stocked appropriately.

In some implementations, the warehouse management system evaluates historical data to determine a weighted average contribution value (e.g., a weighted value of a wholesaler margin and a margin of an alternate fulfillment center) that would be obtained if an item corresponding to a unit identifier is not stocked, because non-stocked unit identifiers may have multiple flow path options to reach the end customer (e.g., by a switch/alternate fulfillment center or wholesaler).

In some implementations, the warehouse management system may count the number of times that a unit identifier set is ordered independently, for example, in order to determine a contribution value, a frequency of a unit identifier set (e.g., as described in FIG. 2A), an annualized independent count of a frequent unit identifier set, etc. When counting the number of times that a frequent unit identifier set is ordered (e.g., the number of orders in which the set appears), the largest frequent unit identifier sets (e.g., those sets with the greatest number of members) may be counted first and then removed from the pool of sets from which to count—this prevents double counting when a unit identifier belongs to multiple frequent unit identifier sets. Similarly, if there is more than one largest frequent unit identifier set, then the set with the highest frequency may be counted first and then removed from the pool of sets from which to count.

In some implementations, after counting the number of times that a frequent unit identifier set is ordered, the order table is updated (e.g., as mentioned, a set is removed from the pool to prevent double counting). For instance, continuing the example of Table 1, the frequent unit identifier set {B, C, D} is counted first ({B, C, D} appear 3 times in the 10 orders) and then removed from the order table. For example, Table 2 illustrates an example of an updated order table after subtracting the {B, C, D} counts.

TABLE 2

| Order# | A | B | C | D |
|---|---|---|---|---|
| 1 | 1 | 1 | 0 | 1 |
| 2 | 2 | | | |
| 3 | | 3 | 2 | |
| 4 | 1 | 1 | | |
| 5 | | 1 | | |
| 6 | 1 | | | 2 |
| 7 | 4 | 1 | | |
| 8 | 2 | 1 | 2 | |
| 9 | | 1 | 1 | |
| 10 | 1 | | | |

Continuing the example from Tables 1 and 2, if the number of times that each frequent unit identifier set appears is counted, then Table 3 shows the total and independent counts for each frequent unit identifier set.

TABLE 3

| Frequent Unit Identifier set | Total count | Independent Counts |
|---|---|---|
| {B, C, D} | 3 | 3 |
| {B, C} | 5 | 4 |
| {A, B} | 4 | 3 |
| {C, D} | 3 | 0 |
| {B, D} | 3 | 0 |
| {A} | 7 | 9 |
| {B} | 7 | 2 |
| {C} | 5 | 1 |
| {D} | 4 | 3 |

The contribution value per unit of a frequent unit identifier set may be the sum of the contribution value per unit of the set's members. In order to annualize the contribution value of a frequent unit identifier set, the independent counts of the set may be multiplied by the contribution value per unit and generalized for a year.

Once the contribution values 116 and/or the differences between the contribution values have been determined, they may be transmitted to or received by the optimization module 108 for use in computing a stocking decision.

The optimization module 108 leverages the contribution values 116, the ICE prevention opportunity 112, and the unit identifier affinities embodied in the frequent unit identifier sets 106 to optimize a decision for stocking or destocking items for each fulfillment center. In particular, in some implementations, the optimization module 108 may use the model represented by the objective function (1) with constraints 2-5 to optimize the stocking decision.

$$\text{Max} \sum_{i=1}^{N} IC_i \cdot x_i \cdot [m_i^A - m_i^I] + \sum_{i=1}^{N} \sum_{j=1}^{M} y_j \cdot z_j^i \cdot O_j \cdot ICE(j) \quad (1)$$

$$\text{s.t.} \quad y_j \leq \sum_{i=1}^{N} z_j^i \cdot x_i \quad \forall j \in \{1, 2, \ldots, M\} \quad (2)$$

-continued $$y_i \geq z_j^i \cdot x_i \quad \forall \, i \in \{1, 2, \ldots, N\}, \, j \in \{1, 2, \ldots, M\} \quad (3)$$

$$\sum_{j=1}^{M} y_j = UI\text{Max} \quad (4)$$

$$x_i, y_j \in \{0, 1\} \quad (5)$$

In functions (1)-(5), the following indices are used: i indicates frequent unit identifier sets and j indicates unit identifiers. The following parameters are used: $m_i^A$ is the contribution value per unit of a frequent unit identifier set i if the set is stocked; $m_i^I$ is the contribution value per unit of a frequent unit identifier set i if the set is not stocked (The contribution value $m_i^I$ will be the reduced value obtained by either getting the item from the wholesaler at a higher cost or getting the item from an alternative fulfillment center by paying a different, potentially higher, delivery expense.); $IC_i$ is the annualized independent count of frequent unit identifier set i; $z_j^i$ is equal to 1 if unit identifier j belongs to frequent unit identifier set i and equal to 0 otherwise; $O_j$ is the number of orders that have unit identifier j in them; ICE(j) is the unit cost of an incremental carton for unit identifier j; and UIMax is the maximum number of stocked unit identifiers in a fulfillment center. The following decision variables are used: $x_i$ is equal 1 if frequent unit identifier set i is stocked and equal to 0 otherwise; and $y_j$ is equal to 1 if unit identifier j is stocked and equal to 0 otherwise.

The objective function (1) maximizes the contribution value and the ICE prevention opportunity that stocking a frequent unit identifier set may create. Constraint (2) keeps a unit identifier non-stocked if it does not belong to any stocked frequent unit identifier set. Constraint (3) stocks every unit identifier that belongs to at least one stocked frequent unit identifier set. Constraint (4) limits the maximum number of stocked unit identifiers and constraint (5) defines the decision variable types.

One efficient way to solve the objective function (1) includes calculating the objective function for each frequent unit identifier set, determining the weighted contribution value and ICE prevention opportunity value for each frequent unit identifier set (e.g., if a frequent unit identifier set has 4 members and its contribution value plus ICE prevention opportunity value is 100, then its weighted value would be 100/4=25), sorting the frequent unit identifier sets based on their weighted objective function, and selecting the frequent unit identifier sets based on their weighted objective function. This approach balances selecting a larger frequent unit identifier set that may have a higher margin, but that takes up more space in a fulfillment center. An implementation of an efficient method 200 for determining which items to stock in a fulfillment center is described in further detail in reference to FIGS. 2A and 2B.

The stocking decision 118 is sent from the optimization module 108 to the inventory replenishment system 120 (e.g., the inventory replenishment system 120 may stock items based on a stocking decision, as described elsewhere herein). In particular, once the stocking decision is made, the data for which unit identifier will be stocked or destocked in each fulfillment center is transmitted to inventory replenishment system 120 to stock or destock an item in the fulfillment center. In some implementations, the inventory replenishment system 120 marks unit identifiers as active or inactive based on the stocking decision 118. An active status may set the unit identifiers to be stocked or restocked. An inactive status may prevent the corresponding unit identifiers from being stocked or restocked and/or may set the corresponding unit identifiers to be liquidated or otherwise destocked (e.g., depending on the potential profit by replacing the items with more profitable items). Additionally, along with the activate and inactivate signals, the inventory replenishment system 120 may generate or load a forecast for the unit identifiers to use in computing the number and frequency to stock items corresponding to the active unit identifiers. The forecast may be determined using machine learning methods based on historical demand and forward adjustments.

The components 104, 108, and 120, among other components, are described in further detail below, for example, in regard to at least FIG. 3.

It should be noted that the processes and/or portions of the processes described herein, for example, in reference to FIG. 1 may be run periodically to adjust stocking decisions based on changing demand patterns to maximize margin and minimize delivery expense. The frequency of running these processes may be an administratively defined figure, may be dynamically determined based on a measurement of the relevance of the unit identifiers to the current orders, or may be set based on some other criteria defined in the warehouse management system.

Figure 2A:
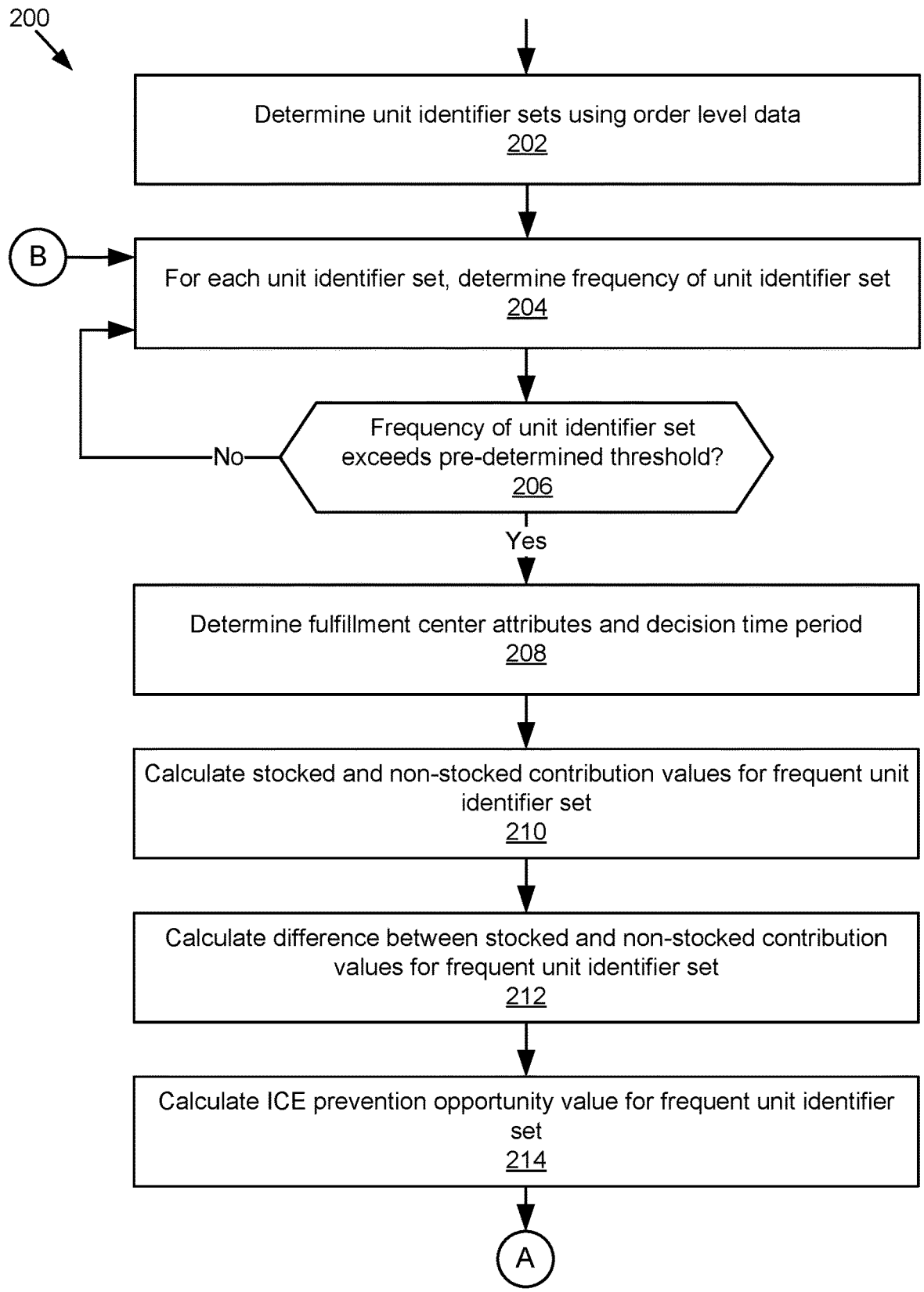
FIGS. 2A and 2B are flowcharts illustrating an example method for determining which items to stock in a fulfillment center.
Figure 2B:
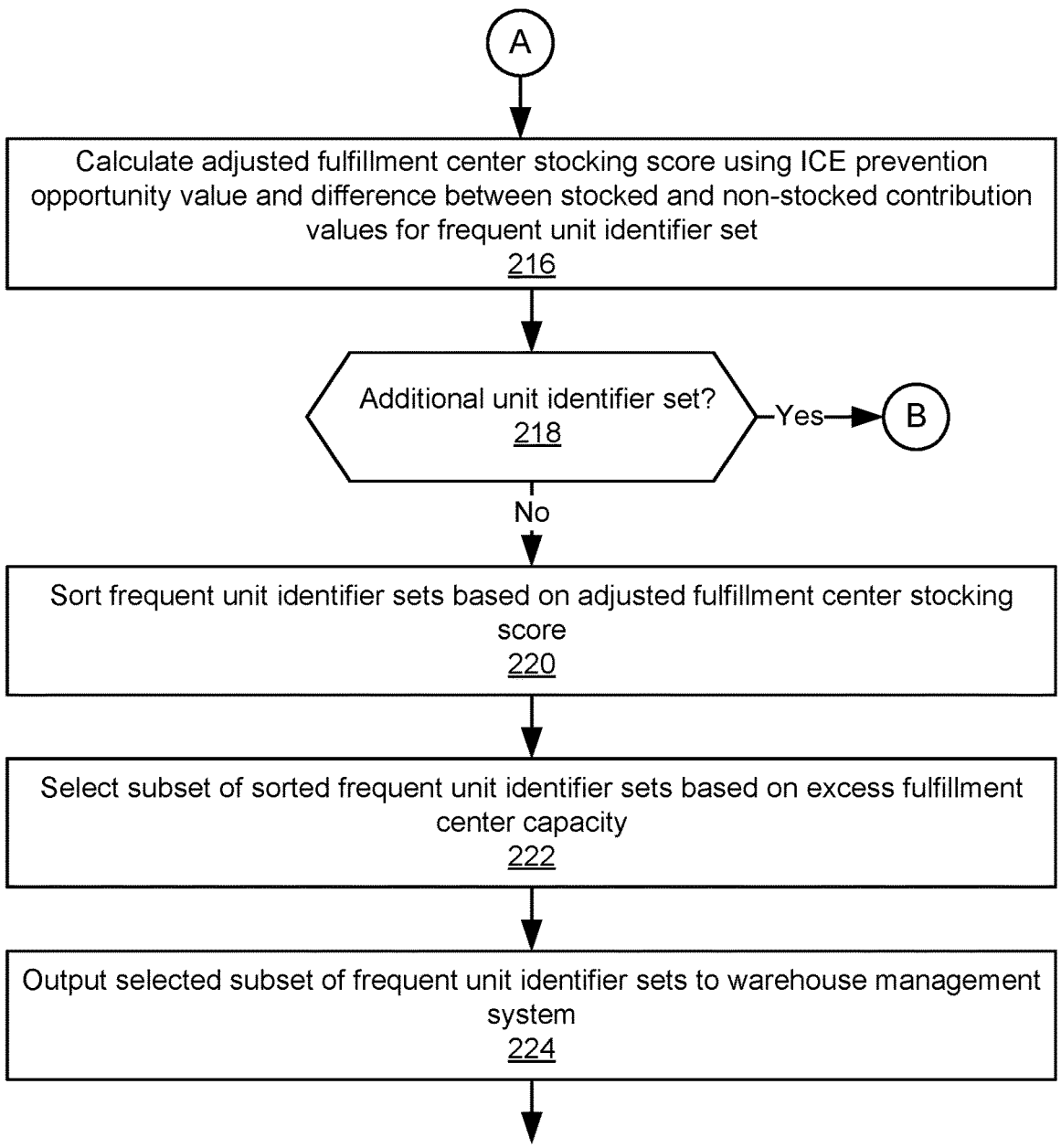

FIGS. 2A and 2B are a flowchart illustrating an example method 200 for determining which items to stock in a fulfillment center. A stocking decision may be made at the unit identifier level for a fulfillment center. The method 200 enables a warehouse management system to make a stocking decision for a fulfillment center with a limited set of items that can be stocked in an efficient and intelligent way.

Unit identifier sets may be generated based on an affinity using order level data, as described at least in steps 202 through 206. In some implementations, the sets of unit identifiers are based on affinities between items uniquely identified by the unit identifier. An affinity indicates a relationship between two or more items, for example, based on a threshold frequency of those items co-appearance within an order (e.g., as described in steps 204 and 206), a shopping cart, online context, etc. At 202, the unit identifier affinity module 104 determines unit identifier sets (e.g., groups of unit identifiers, such as pairs, triplets, etc.) using order level data. In particular, the unit identifier affinity module 104 may determine unit identifier sets using order data, wherein each unit identifier set appears within at least on individual order, as described elsewhere herein.

At 204, for each unit identifier set, the unit identifier affinity module 104 determines the frequency of that unit identifier set, and at 206, the unit identifier affinity module 104 may determine whether the frequency of the unit identifier set exceeds a pre-determined threshold frequency, for example, to identify frequent unit identifier sets. For instance, the unit identifier affinity module 104 determines a quantity of individual orders in which each unit identifier set appears based on a pre-determined or pre-defined threshold frequency.

If the frequency for a particular unit identifier set does not exceed the threshold, as determined at 206, then the unit identifier affinity module 104 returns to 204 to evaluate the next unit identifier set. However, if, at 206, the frequency of the unit identifier set exceeds the threshold, then the method 200 continues to 208. At 208, the optimization module 108 may determine fulfillment center attributes and a decision time period. In some implementations, a fulfillment center and a time period for analysis may be selected, for example, by an administrator or by a parameter of a warehouse management system. Further, other attributes of the fulfillment center may be determined, such as a geographic location, costs of shipping or handling at that fulfillment center, an overall storage capacity, a storage capacity for certain types of items, a shipment speed, how quickly items are rotated through the fulfillment center, etc.

At 210, the optimization module 108 may calculate stocked and non-stocked contribution values for the frequent unit identifier set and, at 212, the optimization module 108 may calculate the difference between the stocked and non-stocked contribution values for the frequent unit identifier set. In some implementations, the stocked contribution value may be determined for a prime fulfillment center. In some implementations, the non-stocked contribution value may be determined for a second fulfillment center, such as a non-prime fulfillment center, a wholesaler, a manufacturer, etc.

At 214, the optimization module 108 may calculate the ICE prevention opportunity value for the frequent unit identifier set. In some implementations, the optimization module 108 calculates the ICE prevention opportunity value for each frequent unit identifier set by determining a delivery expense from one or more fulfillment centers (e.g., to a defined location) for items uniquely identified by the unit identifiers in each frequent unit identifier set. The calculation of the ICE prevention opportunity value is described in further detail elsewhere herein, for example, in reference to FIG. 1.

At 216, the optimization module 108 may calculate an adjusted fulfillment center stocking score using the ICE prevention opportunity value and the difference between the stocked and non-stocked contribution values for the frequent unit identifier set. In some implementations, the adjusted fulfillment center stocking score is the ICE prevention opportunity value added to the difference between the stocked and non-stocked contribution values, although other implementations are possible.

At 218, the warehouse management system (e.g., the unit identifier affinity module 104 or the optimization module 108) may determine whether there are additional unit identifier sets for which to calculate adjusted fulfillment center stocking scores. If it is determined at 218 that there are additional unit identifier sets, the method 200 may continue to 204 for the next unit identifier set. If it is determined at 218 that there are no additional unit identifier sets, or another exit condition is satisfied (e.g., time, iterations, etc.), then the method continues to 220 where the optimization module 108 sorts the frequent unit identifier sets based on their adjusted fulfillment center stocking scores. For example, the frequent unit identifier sets may be ordered in a hierarchy from the highest adjusted fulfillment center stocking score to the lowest adjusted fulfillment center stocking score, although other sorting algorithms are also possible and contemplated herein.

At 222, the optimization module 108 may select a subset of the sorted frequent unit identifier sets based on fulfillment center attributes, such as excess fulfillment center capacity. In some implementations, the subset of frequent unit identifier sets is selected by a defined threshold quantity that may be determined for the fulfillment center based on fulfillment center capacity, projected excess capacity, past, current, or projected item demand, etc. For example, the optimization module 108 may select the top (e.g., those sets with the highest adjusted fulfillment center stocking scores) frequent unit identifier sets for stocking based on the projected demand of those sets until the available (e.g., excess, total, projected excess, etc.) capacity of the fulfillment center is reached.

At 224, the optimization module 108 may output the selected subset of frequent unit identifier sets to an inventory replenishment system 120 that manages stocking of items uniquely identified by the unit identifiers, as described above. For example, a stocking decision (e.g., including a hierarchy of frequent unit identifier sets) may be electronically transmitted (e.g., via an application programming interface) to the inventory replenishment system 120, which automatically evaluates and orders items from wholesalers, manufacturers, distributers, etc., for stocking and/or sets items to be destocked.

It should be noted that the steps provided above are provided for illustration and that other processes are possible and contemplated in the techniques described herein. Further, the steps may be performed in different orders than those listed, additional or fewer steps are possible, and the steps and components performing the steps may be delineated differently than those of the provided examples.

Figure 3:
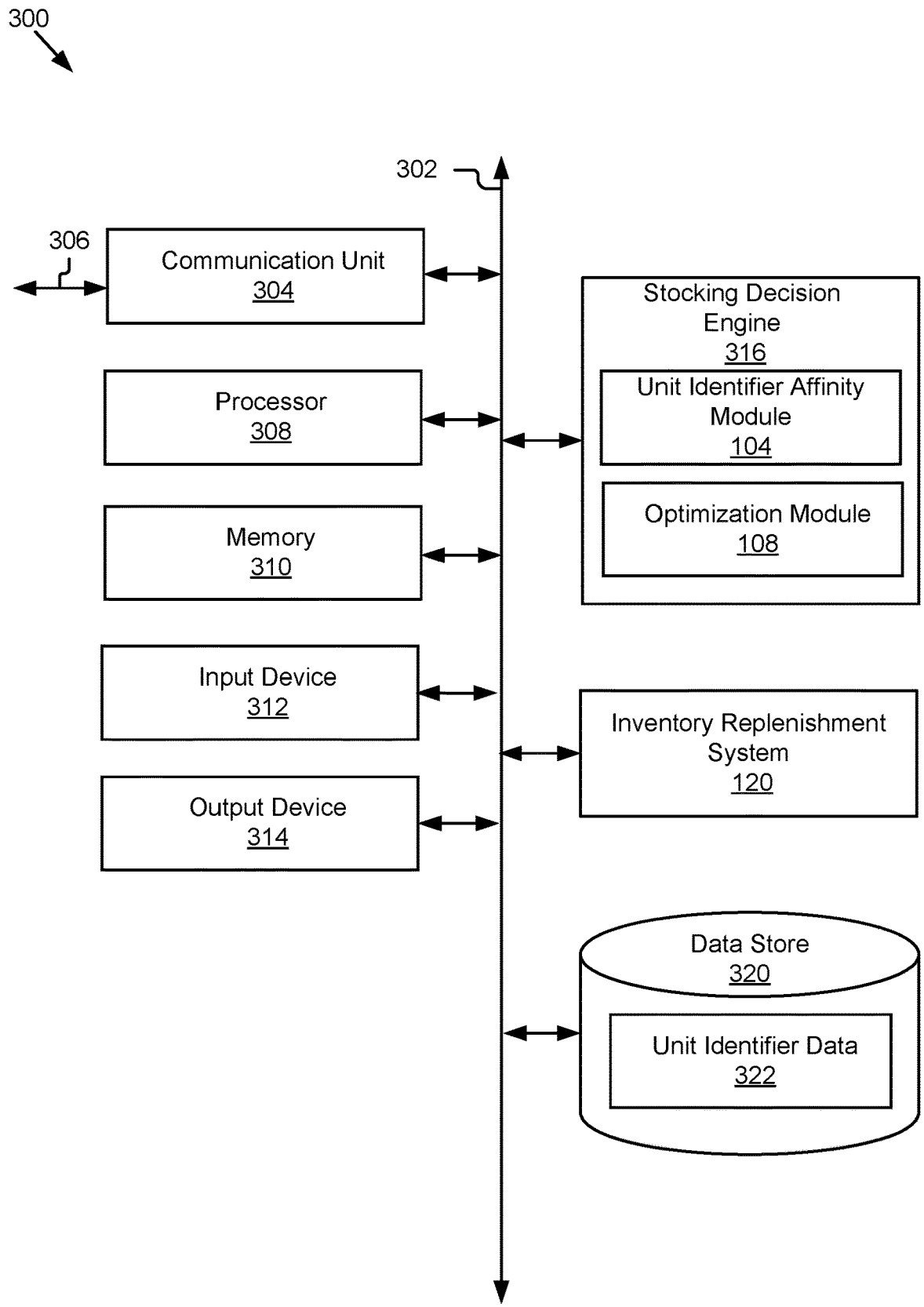
FIG. 3 is a block diagram of an example computing system.

FIG. 3 is a block diagram of an example computing system 300, which may represent the computer architecture of a warehouse management system, as described in FIG. 1, depending on the implementation. As depicted in FIG. 3, the computing system 300 may include a stocking decision engine 316 and an inventory replenishment system 120, depending on the configuration.

The stocking decision engine 316 may determine a stocking decision based on the factors described herein. The stocking decision engine 316 may include a unit identifier affinity module 104, and an optimization module 108, depending on the configuration.

The unit identifier affinity module 104 may include computer logic executable by the processor 808 to perform the operations described throughout this specification to generate unit identifier sets based on affinities between unit identifiers. The unit identifier affinity module 104 may communicate with the other components of the stocking decision engine 316 and/or the computing system 300. For example, the unit identifier affinity module 104 may access the unit identifier data 322 stored in the data store 320 to perform its operations.

The optimization module 108 may include computer logic executable by the processor 308 to perform the operations described throughout this specification to compute a stocking decision. The optimization module 108 may communicate with the other components of the stocking decision engine 316 and/or the computing system 300. For example, the unit identifier affinity module 104 may access the unit identifier data 322 stored in the data store 320 to perform its operations. In another example, the optimization module 108 may receive data from the unit identifier affinity module 104, or other components of the warehouse management system, as described elsewhere herein.

The inventory replenishment system 120 may include computer logic executable by a processor 308 to perform the operations described throughout this specification to stock or destock items corresponding to active or inactive unit identifiers. The inventory replenishment system 120 may communicate with the other components of the computing system 300 or the warehouse management system. For example, the inventory replenishment system 120 may receive a stocking decision and automatically communicate with external servers (e.g., of wholesalers, venders, manufacturers, etc.) via the communication unit 304 and various APIs to stock particular items based on the stocking decision.

As depicted, the computing system 300 may include a communication unit 304, a processor 308, a memory 310, an input device 312, an output device 314, and a data store 320, which may be communicatively coupled by a communication bus 302. The computing system 300 depicted in FIG. 3 is provided by way of example and it should be understood that it may take other forms and include additional or fewer components without departing from the scope of the present disclosure. For instance, various components of the computing device may be coupled for communication using a variety of communication protocols and/or technologies including, for instance, communication buses, software communication mechanisms, computer networks, etc. While not shown, the computing system 300 may include various operating systems, sensors, additional processors, and other physical configurations. Although, for purposes of clarity, FIG. 3 only shows a single communication unit 304, processor 308, memory 310, input device 312, output device 314, and data store 320, it should be understood that the computing system 300 may include a plurality of one or more of these components.

The processor 308 may execute software instructions by performing various input, logical, and/or mathematical operations. The processor 308 may have various computing architectures to method data signals including, for example, a complex instruction set computer (CISC) architecture, a reduced instruction set computer (RISC) architecture, and/or an architecture implementing a combination of instruction sets. The processor 308, which may include one or more processors, may be physical and/or virtual, and may include a single core or plurality of processing units and/or cores. In some implementations, the processor 308 may be capable of generating and providing electronic display signals to a display device, supporting the display of images, capturing and transmitting images, performing complex tasks including various types of feature extraction and sampling, etc. In some implementations, the processor 308 may be coupled to the memory 310 via the bus 302 to access data and instructions therefrom and store data therein. The bus 302 may couple the processor 308 to the other components of the computing system 300 including, for example, the memory 310, the communication unit 304, the input device 312, the output device 314, and the data store 320.

The memory 310 may store and provide access to data to the other components of the computing system 300. The memory 310 may be included in a single computing device or a plurality of computing devices. In some implementations, the memory 310 may store instructions and/or data that may be executed by the processor 308. For example, the memory 310 may store one or more of a stocking decision engine 316, an inventory replenishment system, and their respective components, depending on the configuration. The memory 310 is also capable of storing other instructions and data, including, for example, an operating system, hardware drivers, other software applications, databases, etc. The memory 310 may be coupled to the bus 302 for communication with the processor 308 and the other components of computing system 300.

The memory 310 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 308. In some implementations, the memory 310 may include one or more of volatile memory and non-volatile memory (e.g., RAM, ROM, hard disk, optical disk, etc.). It should be understood that the memory 310 may be a single device or may include multiple types of devices and configurations.

The bus 302 can include a communication bus for transferring data between components of a computing device or between computing devices, a network bus system including a network or portions thereof, a processor mesh, a combination thereof, etc. In some implementations, the stocking decision engine 316, the inventory replenishment system 120, and various other components operating on the computing device 300 (operating systems, device drivers, etc.) may cooperate and communicate via a communication mechanism included in or implemented in association with the bus 302. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 304 may include one or more interface devices (I/F) for wired and wireless connectivity among the components of the warehouse management system and/or other servers (e.g., enabling orders to be received by the unit identifier affinity module, contribution value or ICE data to be received by the optimization module 108, restocking orders to be placed by the inventory replenishment system 120, etc.). For instance, the communication unit 304 may include, but is not limited to, various types known connectivity and interface options. The communication unit 304 may be coupled to the other components of the computing system 300 via the bus 302. The communication unit 304 may be coupled to the network 902 as illustrated by the signal line 306, depending on the configuration. In some implementations, the communication unit 304 can link the processor 308 to a network (e.g., the Internet, an intranet, etc.), which may in turn be coupled to other processing systems. The communication unit 304 can provide other connections to a network and to servers or computing devices using various standard communication protocols.

The input device 312 may include any device for inputting information into the computing system 300. In some implementations, the input device 312 may include one or more peripheral devices. For example, the input device 312 may include a keyboard, a pointing device, microphone, an image/video capture device (e.g., camera), a touch-screen display integrated with the output device 314, etc.

The output device 314 may be any device capable of outputting information from the computing system 300. The output device 314 may include one or more of a display (LCD, OLED, etc.), a printer, a 3D printer, a haptic device, audio reproduction device, touch-screen display, etc. In some implementations, the output device is a display, which may display electronic images and data output by the computing system 300 for presentation to a user (e.g., an administrator of the warehouse management system). In some implementations, the computing system 300 may include a graphics adapter (not shown) for rendering and outputting the images and data for presentation on output device 314. The graphics adapter (not shown) may be a separate processing device including a separate processor and memory (not shown) or may be integrated with the processor 308 and memory 310.

The data store 320 is an information source for storing and providing access to data. The data stored by the data store 320 may organized and queried using various criteria including any type of data stored by them, such as unit identifiers, affinity data, order data, contribution values, ICE, ICE prevention opportunity values, item attributes, etc. The data store 320 may include data tables, databases, or other organized collections of data. An example of the types of data stored by the data store 320 may include, but is not limited to unit identifier data 322. In some instances, the data store 320 may also include, item data (e.g., item attributes, historical and/or predicted demand, etc.), fulfillment center attributes, etc.

The unit identifier data 322 may include data for unit identifiers, such as affinity data, order data, demand data, contribution value data, ICE and ICE prevention opportunity value data, stocking decision data, etc. The unit identifier data 322 may be stored in any suitable format or form, such as a matrix or in other configurations capable of facilitating the operations of the stocking decision engine 316 and/or inventory replenishment system 120.

The data store 320 may be included in the computing system 300 or in another computing system and/or storage system distinct from but coupled to or accessible by the computing system 300. The data store 320 can include one or more non-transitory computer-readable mediums for storing the data. In some implementations, the data store 320 may be incorporated with the memory 310 or may be distinct therefrom. In some implementations, the data store 322 may store data associated with a database management system (DBMS) operable on the computing system 300. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein, for example, in reference to FIG. 3 may be further delineated or changed without departing from the techniques described herein. For example, the processes described throughout this disclosure may be performed by fewer, additional, or different components.

FIG. 4 is a diagram 400 illustrating an example implementation of fulfillment centers serving various geographic regions. In the diagram 400, fulfillment centers 402 through 414 are illustrated, with each fulfillment center primarily serving a geographic region 422 through 434, respectively. The fulfillment centers 402-414 may include first party fulfillment centers for a particular entity, although they may also or alternatively include third-party fulfillment centers, such as those for wholesalers, other vendors, manufacturers, etc.

For example, consider that a stocking decision is being computed for the geographic region 424, which is primarily served by fulfillment center 404. The warehouse management system may determine which orders are to be shipped to the geographic region 424, for which the fulfillment center 404 is the prime, or closest fulfillment center. The warehouse management system may then determine a stocking decision for the fulfillment center 404 using the techniques described herein. Additionally, the warehouse management system may use one or more of the remaining fulfillment centers 402 and 406-414 (or other fulfillment centers not shown) as alternative fulfillment centers that may fulfill all or portions of an order, potentially at an increased ICE and/or decreased contribution value.

For example, customers in the geographic region 424 may typically order sunscreen and beach balls; customers in the geographic region 426 may typically order sunscreen and insect repellant, but rarely order beach balls; and customers in the geographic region 428 may typically order umbrellas and rain jackets while rarely ordering sunscreen and beach balls. Accordingly, for example, fulfillment center 404 may be more likely to stock sunscreen and beach balls than fulfillment center 412.

In some implementations, the warehouse management system may determine a stocking decision for a plurality of the fulfillment centers 402-414 rather than a single fulfillment center in isolation. Using the techniques described herein, the warehouse management system may balance certain factors, such as delivery expense, additional or decrease cost, etc., with availability for frequent unit identifier sets thereby allowing the group of fulfillment centers 402-414 to increase overall contribution value and decrease overall ICE for the system.

The techniques described herein provide many benefits and have substantially improved the underlying technology for automated inventory management and inventory stocking, especially in systems where many thousands or millions of items are available and shipped on a regular basis from one or more fulfillment centers. Specifically, the techniques described herein have provided substantial commercial success over existing methods of inventory management.

In one instance, to test the techniques described herein, fulfillment centers A, B, C, and D were selected and analysis was completed for time periods 3, 4, and 5. Existing methods were tested against the new techniques described herein (e.g., where contribution values, ICE prevention opportunities, and affinities are used to determine a stocking decision). Each of the implementations of the techniques described herein were implemented using a SQL server for the testing.

Table 4 illustrates example results of the test comparing existing inventory management methods with the new inventory management techniques described herein in terms of annualized margin gain. As can be observed, the annualized margin gain of the new techniques result in improvements over the existing methods by approximately 100%.

TABLE 4

| Fulfillment Center | Annualized restock margin gain using the current method | Annualized restock margin gain using the proposed method |
| --- | --- | --- |
| A | $200,000 | $400,000 |
| B | $250,000 | $455,000 |
| C | $125,000 | $365,000 |
| D | $265,000 | $478,000 |
| Total | $840,000 | $1,698,000 |

The ICE savings was computed for the test after preparing a restock list using each of the existing method and the new techniques described herein. Table 5 lists example annualized ICE savings for both the existing method and the new technique. As can be observed, the annualized ICE savings by the new techniques is improved over the existing methods by approximately 57%.

TABLE 5

| Fulfillment Center | Annualized ICE savings using the current method | Annualized ICE savings using the proposed method |
| --- | --- | --- |
| A | $117,000 | $175,000 |
| B | $115,000 | $145,000 |

TABLE 5-continued

| Fulfillment Center | Annualized ICE savings using the current method | Annualized ICE savings using the proposed method |
|---|---|---|
| C | $95,000 | $225,000 |
| D | $60,000 | $62,000 |
| Total | $387,000 | $607,000 |

It should be understood that the methods described herein are provided by way of example, and that variations and combinations of these methods, as well as other methods, are contemplated. For example, in some embodiments, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A system comprising:
   a stocking decision engine configured to:
      determine affinities between unit identifiers based on order level data;
      determine one or more sets of unit identifiers based on the affinities between the unit identifiers and the order level data, the affinity for each of the one or more sets of unit identifiers indicating a probability that the set of unit identifiers occur in a common order;
      determine one or more incremental carton and expense prevention opportunity (ICEPO) values for the one or more sets of unit identifiers based on carton and expense data;
      determine one or more contribution values for unit identifiers in the one or more sets of unit identifiers;

generate a subset of unit identifiers from the one or more sets of unit identifiers based on the affinity for each of the one or more sets of unit identifiers and a combination between the one or more ICEPO values and the one or more contribution values for the one or more sets of unit identifiers; and transmit an electronic data signal indicating the subset of unit identifiers to a computing system of an inventory replenishment system via a computer interface; and the inventory replenishment system configured to:
receive the subset of unit identifiers from the stocking decision engine via the computer interface; and
stock or destock one or more items in a fulfillment center based on the subset of unit identifiers.

2. The system of claim 1, wherein the inventory replenishment system is further configured to stock or destock items in the fulfillment center based on a forecasted demand of the one or more items for a geographic region served by the fulfillment center.

3. The system of claim 1, wherein the inventory replenishment system is further configured to:
generate the electronic data signal based on the subset of the one or more sets of unit identifiers and forecast data; and
perform one or more of providing a graphical display using the electronic data signal and transmitting the electronic data signal based on the forecast data and the subset of the one or more sets of unit identifiers to the inventory replenishment system via an application programming interface.

4. The system of claim 3, wherein the inventory replenishment system is further configured to:
compute the forecast data associated with the subset of the one or more sets of unit identifiers using a machine learning model trained using the order level data.

5. The system of claim 1, wherein the inventory replenishment system is further configured to:
calculate an ICEPO value for each of the one or more sets of unit identifiers based on a comparison of fulfillment of the set of unit identifiers from the fulfillment center using a single carton with fulfillment of a first unit identifier of the set of unit identifiers from the fulfillment center using a first carton and fulfillment of a second unit identifier of the set of unit identifiers from a second fulfillment center using a second carton.

6. The system of claim 1, wherein the inventory replenishment system is further configured to:
calculate an adjusted fulfillment center stocking score using an ICEPO value and a difference between a first contribution value and a second contribution value for each of the one or more sets of unit identifiers; and
select the subset of the one or more sets of unit identifiers based on the adjusted fulfillment center stocking score.

7. The system of claim 6, wherein the inventory replenishment system is further configured to:
determine the first contribution value for each of the one or more sets of unit identifiers based on a first fulfillment of one or more units of the set of unit identifiers using inventory stocked in the fulfillment center;
determine the second contribution value for each of the one or more sets of unit identifiers based on a second fulfillment of one or more units of the set of unit identifiers using an alternative fulfillment center to the fulfillment center; and calculate the difference between the first contribution value and the second contribution value for each of the one or more sets of unit identifiers.

8. The system of claim 6, wherein selecting the subset of the one or more sets of unit identifiers based on the adjusted fulfillment center stocking score includes:
sorting the one or more sets of unit identifiers into a hierarchy based on the adjusted fulfillment center stocking score, and
selecting the subset of the one or more sets of unit identifiers based on a threshold quantity of sets of unit identifiers, the hierarchy, and an excess stocking capacity of the fulfillment center.

9. The system of claim 1, wherein calculating the one or more ICEPO values for the one or more sets of unit identifiers includes:
determining a first delivery expense from the fulfillment center to a defined location for items identified by the one or more sets of unit identifiers.

10. The system of claim 9, wherein calculating the one or more ICEPO values for the one or more sets of unit identifiers includes:
determining a second delivery expense from an alternate fulfillment center to the defined location for the items identified by the one or more sets of unit identifiers.

11. A computer-implemented method comprising:
determining affinities between unit identifiers based on order level data;
determining one or more sets of unit identifiers based on the affinities between the unit identifiers and the order level data, the affinity for each of the one or more sets of unit identifiers indicating a probability that the set of unit identifiers occur in a common order;
determining one or more incremental carton and expense prevention opportunity (ICEPO) values for the one or more sets of unit identifiers based on carton and expense data;
determining one or more contribution values for unit identifiers in the one or more sets of unit identifiers;
generating a subset of unit identifiers from the one or more sets of unit identifiers based on the affinity for each of the one or more sets of unit identifiers and optimizing a combination between the one or more ICEPO values and the one or more contribution values for the one or more sets of unit identifiers; and
performing an operation including automatically stocking or destocking one or more items in a fulfillment center based on the subset of unit identifiers.

12. The computer-implemented method of claim 11, further comprising:
stocking or destocking items in the fulfillment center based on a forecasted demand of the one or more items for a geographic region served by the fulfillment center.

13. The computer-implemented method of claim 11, further comprising:
generating an electronic data signal based on the subset of the one or more sets of unit identifiers and forecast data; and
performing one or more of providing a graphical display using the electronic data signal and transmitting the electronic data signal based on the forecast data and the subset of the one or more sets of unit identifiers to an inventory replenishment system via an application programming interface.

14. The computer-implemented method of claim 13, further comprising:

computing the forecast data associated with the subset of the one or more sets of unit identifiers using a machine learning model trained using the order level data.

15. The computer-implemented method of claim 11, further comprising:
calculating an ICEPO value for each of the one or more sets of unit identifiers based on a comparison of fulfillment of the set of unit identifiers from the fulfillment center using a single carton with fulfillment of a first unit identifier of the set of unit identifiers from the fulfillment center using a first carton and fulfillment of a second unit identifier of the set of unit identifiers from a second fulfillment center using a second carton.

16. The computer-implemented method of claim 11, further comprising:
calculating an adjusted fulfillment center stocking score using an ICEPO value and a difference between a first contribution value and a second contribution value for each of the one or more sets of unit identifiers; and
selecting the subset of the one or more sets of unit identifiers based on the adjusted fulfillment center stocking score.

17. The computer-implemented method of claim 16, further comprising:
determining the first contribution value for each of the one or more sets of unit identifiers based on a first fulfillment of one or more units of the set of unit identifiers using inventory stocked in the fulfillment center;
determining the second contribution value for each of the one or more sets of unit identifiers based on a second fulfillment of one or more units of the set of unit identifiers using an alternative fulfillment center to the fulfillment center; and
calculating the difference between the first contribution value and the second contribution value for each of the one or more sets of unit identifiers.

18. The computer-implemented method of claim 16, wherein selecting the subset of the one or more sets of unit identifiers based on the adjusted fulfillment center stocking score includes:
sorting the one or more sets of unit identifiers into a hierarchy based on the adjusted fulfillment center stocking score, and
selecting the subset of the one or more sets of unit identifiers based on a threshold quantity of sets of unit identifiers, the hierarchy, and an excess stocking capacity of the fulfillment center.

19. The computer-implemented method of claim 11, wherein calculating the one or more ICEPO values for the one or more sets of unit identifiers includes:
determining a first delivery expense from the fulfillment center to a defined location for items identified by the one or more sets of unit identifiers; and
determining a second delivery expense from an alternate fulfillment center to the defined location for the items identified by the one or more sets of unit identifiers.

20. A system comprising:
one or more processors; and
one or more memories storing instructions that, when executed by the one or more processors, cause the system to:
determine affinities between unit identifiers based on order level data;
determine one or more sets of unit identifiers based on the affinities between the unit identifiers and the order level data, the affinity for each of the one or more sets of unit identifiers indicating a probability that the set of unit identifiers occur in a common order;
determine one or more incremental carton and expense prevention opportunity (ICEPO) values for the one or more sets of unit identifiers based on carton and expense data;
determine one or more contribution values for unit identifiers in the one or more sets of unit identifiers;
generate a subset of unit identifiers from the one or more sets of unit identifiers based on the affinity for each of the one or more sets of unit identifiers and a combination between the one or more ICEPO values and the one or more contribution values for the one or more sets of unit identifiers; and
perform an operation including automatically stocking or destocking one or more items in a fulfillment center based on the subset of unit identifiers.

* * * * *